United States Patent [19]

Yamamoto et al.

[11] Patent Number: 4,992,511
[45] Date of Patent: Feb. 12, 1991

[54] CYCLO-OLEFINIC RANDOM COPOLYMER COMPOSITION AND REACTION PRODUCT THEREOF

[75] Inventors: Yohzoh Yamamoto; Satoru Moriya, both of Iwakuni, Japan

[73] Assignee: Mitsui Petrochemical Industries, Ltd., Tokyo, Japan

[21] Appl. No.: 413,695

[22] Filed: Sep. 28, 1989

[30] Foreign Application Priority Data

Sep. 30, 1988 [JP] Japan .................................. 63-246559

[51] Int. Cl.[5] ...................... C08L 23/08; C08L 23/26; C08L 45/00; C08L 53/02
[52] U.S. Cl. .......................................... 525/97; 525/98; 525/193; 525/194; 525/210; 525/211; 525/216; 524/505; 524/518; 524/553
[58] Field of Search .................... 525/97, 98, 193, 194

[56] References Cited

U.S. PATENT DOCUMENTS

| | | | |
|---|---|---|---|
| 4,874,808 | 10/1989 | Minami et al. | 525/210 |
| 4,918,133 | 4/1990 | Moriya et al. | 525/97 |
| 4,931,520 | 6/1990 | Yamanashi et al. | 525/210 |

OTHER PUBLICATIONS

Neilsen—Mech. Prop. of Polymers & Composites–vol. 1, 1974—pp. 18–19.

Primary Examiner—Carman J. Seccuro
Attorney, Agent, or Firm—Sherman and Shalloway

[57] ABSTRACT

A polymer composition comprising (A) 100 parts by weight of a cyclo-olefinic random copolymer comprising an ethylene component and a cyclo-olefin component and having an intrinsic viscosity $[\eta]$ of 0.05 to 10 dl/g, a glass transition temperature (Tg) of 50° to 230° C., and a softening point of at least 70° C., (B) 5 to 150 parts by weight of at least one flexible polymer having a glass transition temperature of not more than 0° C. and (C) 0.004 to 1.0 part by weight of an organic peroxide and its reaction product.

24 Claims, No Drawings

CYCLO-OLEFINIC RANDOM COPOLYMER COMPOSITION AND REACTION PRODUCT THEREOF

This invention relates to a cyclo-olefinic random copolymer composition having excellent heat resistance, heat aging resistance, chemical resistance, weather resistance, solvent resistance, dielectric properties, rigidity, impact strength and moldability, and a reaction product thereof.

Japanese Laid-Open Patent Publication No. 168708/1985 discloses a cyclo-olefinic random copolymer comprising ethylene and a specific cyclo-olefin component as a resin having excellent heat resistance, rigidity, weather resistance, transparency and dimensional accuracy during molding. This resin, however, does not necessarily have sufficient impact strength.

In an attempt to improve the impact strength of the above resin, a composition comprising the above resin and a rubber component is described in Japanese Laid-Open Patent publication No. 273655/88. The impact strength of this composition, however, is still insufficient, and a further improvement in impact strength is desired.

It is an object of this invention to provide a cyclo-olefinic random copolymer composition having excellent heat resistance, heat aging resistance, chemical resistance, weather resistance, solvent resistance, dielectric properties, rigidity, impact strength and moldability, and a reaction product thereof.

Other objects of this invention along with its advantages will become apparent from the following description.

These objects and advantages are firstly achieved by a reaction product of a polymer composition comprising (A) 100 parts by weight of a cyclo-olefinic random copolymer comprising an ethylene component and a cyclo-olefin component and having an intrinsic viscosity $[\eta]$, measured in decalin at 135° C., of 0.05 to 10 dl/g, a glass transition temperature (Tg) of 50° to 230° C., and a softening point of at least 70° C., (B) 5 to 150 parts by weight of at least one flexible polymer having a glass transition temperature of not more than 0° C. selected from the group consisting of
(a) a flexible cyclo-olefinic random copolymer comprising an ethylene component, a cyclo-olefin component and an alpha-olefin component having 3 to 20 carbon atoms,
(b) an amorphous or low-crystalline flexible olefinic copolymer comprising at least two components selected from the group consisting of an ethylene component and alpha-olefin components having 3 to 20 carbon atoms,
(c) a flexible olefin/nonconjugated diene copolymer comprising a non-conjugated diene component and at least two components selected from the group consisting of an ethylene component and alpha-olefin components having 3 to 20 carbon atoms, and
(d) a flexible aromatic vinyl copolymer selected from the group consisting of random copolymers and block copolymers each comprising an aromatic vinyl hydrocarbon component and a conjugated diene component, and hydrogenation products of these copolymers, and
(C) 0.004 to 1.0 part by weight of an organic peroxide.

The cyclo-olefinic random copolymer (A) used in the polymer composition of this invention comprises an ethylene component and a cyclo-olefin component. Cyclo-olefins of the following formulae (I) to (V) are especially preferably used in this invention.

Cyclo-olefins of formula (I)

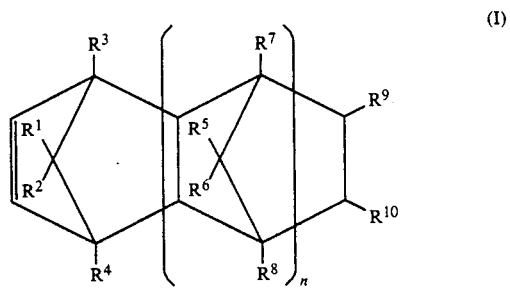

wherein $R^1$, $R^2$, $R^3$, $R^4$, $R^5$, $R^6$, $R^7$, $R^8$, $R^9$ and $R^{10}$ are identical or different, and each represents a hydrogen atom, a halogen atom or a monovalent hydrocarbon group, and n is 0 or a positive integer.

Cyclo-olefins of formula (II)

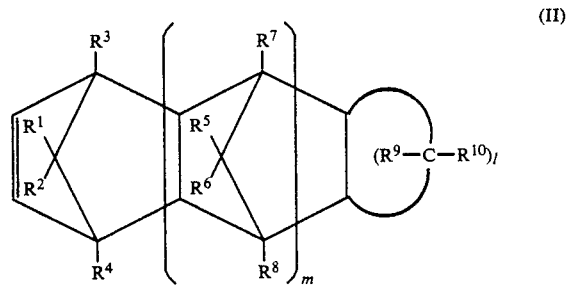

wherein $R^1$, $R^2$, $R^3$, $R^4$, $R^5$, $R^6$, $R^7$, $R^8$, $R^9$ and $R^{10}$ are as defined in formula (I), m is 0 or a positive integer, and L is an integer of at least 3.

Cyclo-olefins of formula (III)

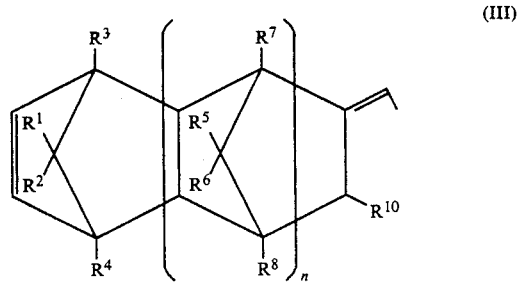

wherein $R^1$, $R^2$, $R^3$, $R^4$, $R^5$, $R^6$, $R^7$, $R^8$, $R^9$ and $R^{10}$ and n are as defined in formula (I).

Cyclo-olefins of formula (IV)

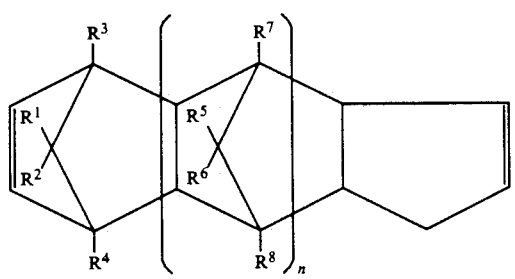
(IV)

wherein $R^1$, $R^2$, $R^3$, $R^4$, $R^5$, $R^6$, $R^7$, $R^8$ and n are as defined in formula (I).

Cyclo-olefins of formula (V)

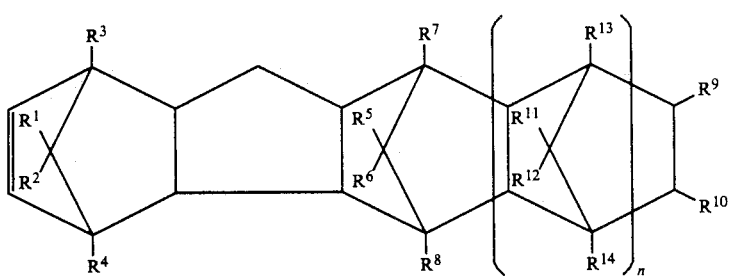
(V)

wherein $R^1$, $R^2$, $R^3$, $R^4$, $R^5$, $R^6$, $R^7$, $R^8$, $R^9$ and $R^{10}$ an n are as defined in formula (I), and $R^{11}$, $R^{12}$, $R^{13}$ and $R^{14}$, independently from each other and from $R^1$, are selected from a hydrogen atom, halogen atoms and monovalent hydrocarbon groups.

The cyclo-olefins of formulae (I) and (II) are especially preferred. These cyclo-olefins may be used singly or in combination with one another.

In these formulae (I) to (V), the monovalent hydrocarbon group defined for $R^1$ to $R^{14}$ is preferably a linear or branched alkyl group having 1 to 10 carbon atoms.

Examples of the cyclo-olefins of general formula (I) include
bicyclo[2.2.1]hept-2-ene

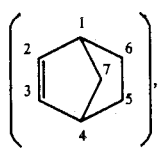

6-methylbicyclo[2.2.1]hept-2-ene,
5,6-dimethylbicyclo[2.2.1]hept-2-ene,
1-methylbicyclo[2.2.1]hept-2-ene,
6-ethylbicyclo[2.2.1]hept-2-ene,
6-n-butylbicyclo[2.2.1]hept-2-ene,
6-isobutyibicyclo[2.2.1]hept-2-ene,
7-methylbicyclo[2.2.1]hept-2-ene,
1,4,5,8-dimethano-1,2,3,4,4a,5,8,8a-octahydronaphthalene

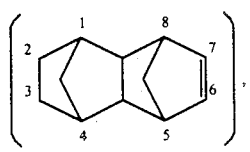

2-methyl-1,4,5,8-dimethano-1,2,3,4,4a,5,8,8a-octahydronaphthalene,
2-ethyl-1,4,5,8-dimethano-1,2,3,4,4a,5,8,8a-octahydronaphthalene,
2-propyl-1,4,5,8-dimethano-1,2,3,4,4a,5,8,8a-octahydronaphthalene,
2-hexyl-1,4,5,8-dimethano-1,2,3,4,4a,5,8,8a-octahydronaphthalene,
2,3-dimethyl-1,4,5,8-dimethano-1,2,3,4,4a,5,8,8a-octahydronaphthalene,
2-methyl-3-ethyl-1,4,5,8-dimethano-1,2,3,4,4a,5,8,8a-octahydronaphthalene,
2-chloro-1,4,5,8-dimethano-1,2,3,4,4a,5,8,8a-octahydronaphthalene,
2-bromo-1,4,5,8-dimethano-1,2,3,4,4a,5,8,8a-octahydronaphthalene,
2-fluoro-1,4,5,8-dimethano-1,2,3,4,4a,5,8,8a-octahydronaphthalene,
2,3-dichloro-1,4,5,8-dimethano-1,2,3,4,4a,5,8,8a-octahydronaphthalene,
2-cyclohexyl-1,4,5,8-dimethano-1,2,3,4,4a,5,8,8a-octahydronaphthalene,
2-n-butyl-1,4,5,8-dimethano-1,2,3,4,4a,5,8,8a-octahydronaphthalene,
2-isobutyl-1,4,5,8-dimethano-1,2,3,4,4a,5,8,8a-octahydronaphthalene,
5,10-dimethyltetracyclo[4.4.0.1$^{2,5}$.1$^{7,10}$]-3-dodecene

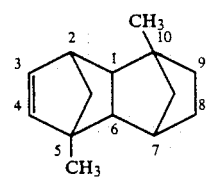

2,10-dimethyltetracyclo[4.4.0.1$^{2,5}$.1$^{7,10}$]-3-dodecene,
11,12-dimethyltetracyclo[4.4.0.1$^{2,5}$.1$^{7,10}$]-3-dodecene,
2,7,9-trimethyltetracyclo[4.4.0.1$^{2,5}$.1$^{7,10}$]-3-dodecene,
2,7,9-trimethyltetracyclo[4.4.0.1$^{2,5}$.1$^{7,10}$]-3-dodecene,
9-ethyl-2,7-dimethyltetracyclo[4.4.0.1$^{2,5}$.1$^{7,10}$]-3-dodecene,
9-isobutyl-2,7-dimethyltetracyclo[4.4.0.1$^{2,5}$.1$^{7,10}$]-3-dodecene,
9,11,12-trimethyltetracyclo[4.4.0.1$^{2,5}$.1$^{7,10}$]-3-dodecene, 9-ethyl-11,12-dimethyltetracyclo[4.4.0.1$^{2,5}$.1$^{7,10}$]-3-dodecene,
9-isobutyl-11,12-dimethyltetracyclo[4.4.0.1$^{2,5}$.1$^{7,10}$]-3-dodecene,
5,8,9,10-tetramethyltetracyclo[4.4.0.1$^{2,5}$.1$^{7,10}$]-3-dodecene,
hexacyclo[6.6.1.1$^{3,6}$.1$^{10,13}$.0$^{2,7}$.0$^{9,14}$]-4-heptadecene

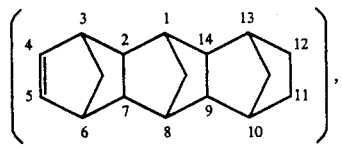

12-methylhexacyclo[6.6.1.1$^{3,6}$.1$^{10,13}$.0$^{2,7}$.0$^{9,14}$]-4-heptadecene,
12-ethylhexacyclo[6.6.1.1$^{3,6}$.1$^{10,13}$.0$^{2,7}$.0$^{9,14}$]-4-heptadecene,
12-isobutylhexacyclo[6.6.1.1$^{3,6}$.1$^{10,13}$.0$^{2,7}$.0$^{9,14}$]-4-heptadecene,
1,6,10-trimethyl-12-isobutylhexacyclo[6.6.1.1$^{3,6}$.1$^{10,13}$.0$^{2,7}$.0$^{9,14}$]-4-heptadecene,
octacyclo[8.8.0.1$^{2,9}$.1$^{4,7}$.1$^{11,18}$.1$^{13,16}$.0$^{3,8}$.0$^{12,17}$]-5-docoene

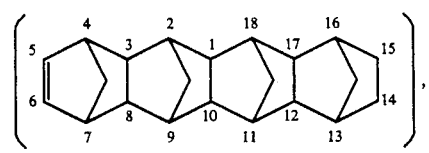

15-methyloctacyclo[8.8.0.1$^{2,9}$.1$^{4,7}$.1$^{11,18}$.1$^{13,16}$.0$^{3,8}$.0$^{12,17}$]-5-docoene, and
15-ethyloctacyclo[8.8.0.1$^{2,9}$.1$^{4,7}$.1$^{11,18}$.1$^{13,16}$.0$^{3,8}$.0$^{12,17}$]-5-docoene.

Examples of the cycloolefins of general formula (II) include
pentacyclo[6.6.1.1$^{3,6}$.0$^{2,7}$.0$^{9,14}$]-4-hexadecene

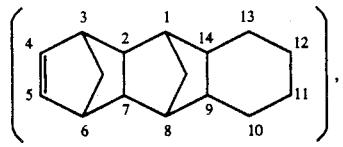

1,3-dimethylpentacyclo[6.6.1.1$^{3,6}$.0$^{2,7}$.0$^{9,14}$]-4-hexadecene,
1,6-dimethylpentacyclo[6.6.1.1$^{3,6}$.0$^{2,7}$.0$^{9,14}$]-4-hexadecene,
15,16-dimethylpentacyclo[6.6.1.13,6.02,7.09,14]-4-hexadecene,
pentacyclo[6.5.1.1$^{3,6}$.0$^{2,7}$.0$^{9,13}$]-4-pentadecene,

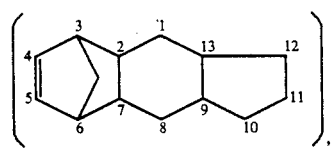

1,3-dimethylpentacyclo[6.5.1.1$^{3,6}$.0$^{2,7}$.0$^{9,13}$]-4-pentadecene,
1,6-dimethylpentacyclo[6.5.1.1$^{3,6}$.0$^{2,7}$.0$^{9,13}$]-4-pentadecene,
14,15-dimethylpentacyclo[6.5.1.1$^{3,6}$.0$^{2,7}$.0$^{9,13}$]-4-pentadecene,
heptacyclo[8.7.0.1$^{2,9}$.1$^{4,7}$.1$^{11,17}$.0$^{3,8}$.0$^{12,16}$]-5-eicocene

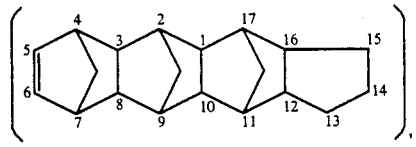

heptacyclo[8.8.0.1$^{2,9}$.1$^{4,7}$.1$^{11,18}$.0$^{3,8}$.0$^{12,17}$]-5-heneicocene,

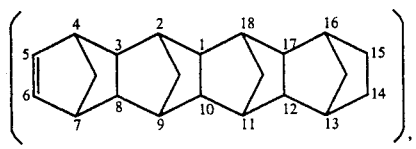

tricyclo[4.3.0.1$^{2,5}$]-3-decene

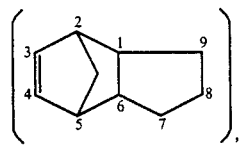

2-methyl-tricyclo[4.3.0.1$^{2,5}$]-3-decene,
5-methyl-tricyclo[4.3.0.1$^{2,5}$]-3-decene,
tricyclo[4.4.0.1$^{2,5}$]-3-undecene

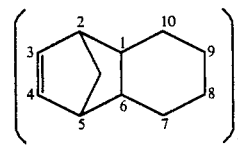

10-methyl-tricyclo[4.4.0.1$^{2,5}$]-3-undecene.

The cycloolefins represented by formulae (I) and (II) may easily be produced by condensing cyclopentadienes with the corresponding olefins by the Diels-Alder reaction.

Examples of the cyclo-olefins of formula (III) include
2-ethylidene-1,4,5,8-dimethano-1,2,3,4,4a,5,8,8a-octahydronaphthalene,
2-ethylidene-3-methyl-1,4,5,8-dimethano-1,2,3,4,4a,5,8,8a-octahydronaphthalene,
2-ethylidene-3-ethyl-1,4,5,8-dimethano-1,2,3,4,4a,5,8,8a-octahydronaphthalene,
2-ethylidene-3-isopropyl-1,4,5,8-dimethano-1,2,3,4,4a,5,8,8a-octahydronaphthalene,
2-ethylidene-3-butyl-1,4,5,8-dimethano-1,2,3,4,4a,5,8,8a-octahydronaphthalene,
2-n-propylidene-1,4,5,8-dimethano-1,2,3,4,4a,5,8,8a-octahydronaphthalene,
2-n-propylidene-3-methyl-1,4,5,8-dimethano-1,2,3,4,4a,5,8,8a-octahydronaphthalene,
2-n-propylidene-3-ethyl-1,4,5,8-dimethano-1,2,3,4,4a,5,8,8a-octahydronaphthalene, 2-n-propylidene-3-isopropyl-1,4,5,8-dimethano-
1,2,3,4,4a,5,8,8a-octahydronaphthalene,
2-n-propylidene-1,4,5,8-3-butyl-1,4,5,8dimethano-
1,2,3,4,4a,5,8,8a-octahydronaphthalene,
2-isopropylidene-1,4,5,8-dimethano-1,2,3,4,4a,5,8,8a-
octahydronaphthalene,
2-isopropylidene-3-methyl-1,4,5,8-dimethano-
1,2,3,4,4a,5,8,8a-octahydronaphthalene,
2-isopropylidene-3-ethyl-1,4,5,8-dimethano-
1,2,3,4,4a,5,8,8a-octahydronaphthalene,
2-isopropylidene-3-isopropyl-1,4,5,8-dimethano-
1,2,3,4,4a,5,8,8a-octahydronaphthalene, and
2-isopropylidene-3-butyl-1,4,5,8-dimethano-
1,2,3,4,4a,5,8,8a-octahydronaphthalene.

These compounds of formula (III) are described in Japanese Laid-Open Patent Publication No. 305111/1988, and can be easily produced by contacting cyclopentadiene compounds (or dicyclopentadienes) with alkylidenebicyclo[2.2.1]hept-2-ene compounds such as 5-ethylidenebicyclo[2.2.1]hept-2-enes by the Diels-Alder reaction.

An example of the compounds of formula (IV) is 4,9,5,8-dimethano-3a,4,4a,5,8,8a,9,9a-octahydro-1H-benzoindene of the following formula

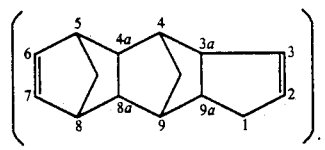

The compounds of formula (IV) are described in Japanese Laid-Open Patent Publication No. 243111/1988, and can be produced by the Diels-Alder reaction of dicyclopentadienes and cyclopentadienes.

Example of the cyclo-olefins of formula (V) include heptacyclo[$1^{3,6}.1^{19,17}.1^{12,15}.0.0^{2,7}.0^{11,16}$]-icos-4-ene

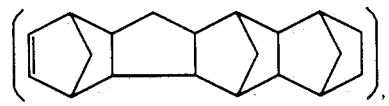

trimethyl-heptacyclo[$1^{3,6}.1^{19,17}.1^{12,15}.0.0^{2,7}.0^{11,16}$]-icos-4-ene

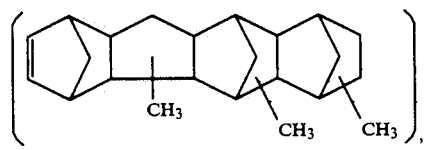

tetramethyl-heptacyclo[$1^{3,6}.1^{19,17}.1^{12,15}.0.0^{2,7}.0^{11,16}$]-icos-4-ene

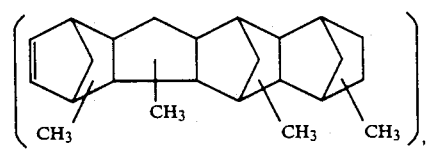

nonacyclo[$1^{1,11}.1^{15,0}.1^{13,20}.1^{15,18}.0^{2,10}.0^{4,9}.0^{12,21}.0^{14,19}$]-pentacos-6-ene

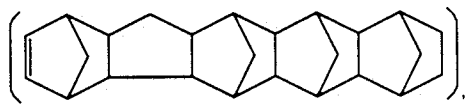

methyl-heptacyclo[$1^{3,6}.1^{19,17}.1^{12,15}.0.0^{2,7}.0^{11,16}$]-icos-4-ene

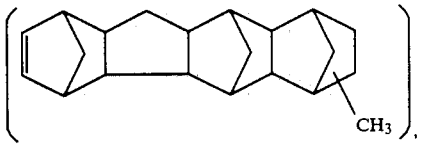

and
methyl-heptacyclo[$1^{3,6}.1^{19,17}.1^{12,15}.0.0^{2,7}.0^{11,16}$]-icos-4-ene

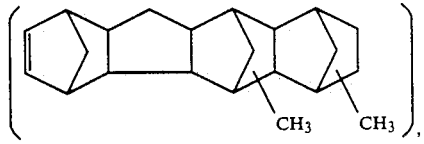

The cyclo-olefins of formula (V) are disclosed in WO89/01950, Laid-Open Specification (PCT/JP85/00849). They may be easily obtained by the Diels-Alder reaction of pentacyclo[$6.5.1^{1,7}.1^{9,12}.0^{2,6}.0^{8,13}$]-pentadec-3-enes (partially hydrogenated products of tricyclopentadienes) and cyclopentadienes.

The cyclo-olefinic random copolymer (A) used in the present invention can be produced by copolymerizing ethylene with at least one of the cyclo-olefins described above. The production method is disclosed, for example, in U.S. Pat. No. 4,614,778. As required, another copolymerizable unsaturated monomer may be used in combination nation in the copolymerization. Examples of the other unsaturated monomer are alpha-olefins having 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene and 1-eicosene and cycloolefins and cyclodienes such as norbornene, ethylidene norbornene and cyclopentadiene.

The cyclo-olefinic random copolymer (A) used in this invention preferably contains 40 to 85 mole %, particularly 50 to 75 mole %, of units derived from the ethylene component, and 15 to 60 mole %, particularly 25 to 50 mole %, of units derived from the cyclo-olefin component. The proportion of the other olefin component if used should be smaller than that of the ethylene component.

The cyclo-olefinic random copolymer (A) has an intrinsic viscosity [$\eta$], measured in decalin at 135° C., of 0.05 to 10 dl/g, preferably 0.08 to 5 dl/g. The cyclo-olefinic random copolymer is substantially linear, and does not contain a gel-like crosslinked structure. This can be substantiated by the fact that it completely dissolves in decalin at 135° C.

The cyclo-olefinic random copolymer (A) has a softening temperature measured by a thermomechanical analyzer (TMA) of at least 70° C., preferably 90° to 250°

C., particularly preferably 100° to 200° C., and a glass transition temperature (Tg) of usually 50° to 230° C., preferably 70° to 210° C.

Furthermore, the cyclo-olefinic random copolymer (A) conveniently used in this invention has a crystallinity, measured by X-ray diffractometry, of 0 to 10%, preferably 0 to 7%, especially preferably 0 to 5%.

The flexible polymer constituting another component of the polymer composition of this invention is selected from the group consisting of (a) a flexible cyclo-olefinic random copolymer comprising an ethylene component, a cyclo-olefin component and an alpha-olefin component having 3 to 20 carbon atoms, (b) an amorphous or low-crystalline flexible olefinic copolymer comprising at least two components selected from the group consisting of an ethylene component and alpha-olefin components having 3 to 20 carbon atoms, (c) a flexible olefin/nonconjugated diene copolymer comprising a nonconjugated diene component and at least two components selected from the group consisting of an ethylene component and alpha-olefin components having 3 to 20 carbon atoms, and (d) a flexible aromatic vinyl copolymer selected from the group consisting of random copolymers and block copolymers each comprising an aromatic vinyl hydrocarbon component and a conjugated diene component, and hydrogenation products of these copolymers.

As a common characteristic, these flexible polymers have a glass transition temperature of not more than 0° C. The individual flexible polymers will be described below in detail.

The flexible cyclo-olefin random copolymer (a) comprises an ethylene component, a cyclo-olefin component and an alpha-olefin component having 3 to 20 carbon atoms. Examples of the cyclo-olefin component may be the same as described hereinabove with regard to the copolymer (A). The cyclo-olefin component may be one or a combination of the cycloolefins, and the alpha-olefin component may be one or a combination of the alpha-olefins.

The flexible cyclo-olefinic random copolymer (a) preferably comprises 40 to 98 mole % of the ethylene component, 2 to 20 mole % of the cyclo-olefin component and 2 to 50 mole % of the alpha-olefin component having 3 to 20 carbon atoms based on the total weight of the ethylene component, the cyclo-olefin component and the alpha-olefin component. Especially preferably, the copolymer (a) comprises 50 to 90 mole % of the ethylene component, 2 to 15 mole % of the cyclo-olefin component and 5 to 40 mole % of the alpha-olefin component having 3 to 20 carbon atoms.

Preferably, the flexible cyclo-olefinic random copolymer (A) is substantially linear with the above components arranged randomly.

The flexible cyclo-olefinic random copolymer (a) has an intrinsic viscosity $[\eta]$, measured in decalin at 135° C., of preferably 0.01 to 10 dl/g, especially preferably 0.08 to 7 dl/g.

The cyclo-olefinic random copolymer (A) and the flexible cyclo-olefinic random copolymer (a) used in this invention can be produced, for example, by the methods disclosed in Japanese Laid-Open Patent Publications Nos. 168708/1985, 120816/1986, 115912/1986, 115916/1986, 271308/1986, 272216/1986, 252406/1987 and 252407/1987.

The amorphous or low-crystalline flexible olefinic copolymer comprises at least two components selected from the group consisting of an ethylene component and alpha-olefin components having 3 to 20 carbon atoms. The alpha-olefins may be those exemplified hereinabove.

Preferably, the flexible olefinic copolymer (b) may be, for example, a copolymer of ethylene and an alpha-olefin having 3 to 20 carbon atoms or a copolymer of propylene and an alpha-olefin having 4 to 20 carbon atoms.

The alpha-olefin constituting the copolymer of the ethylene component and the alpha-olefin component (b) preferably has 3 to 10 carbon atoms.

The alpha-olefin in the copolymer (b) of propylene and the other alpha-olefin preferably has 4 to 10 carbon atoms.

A preferred example of the copolymer of the ethylene component and the alpha-olefin component is a copolymer composed of 30 to 95 mole % of ethylene and 70 to 5 mole % of an alpha-olefin having 3 to 20 carbon atoms, based on the total weight of these components. A copolymer composed of 30 to 95 mole % of propylene and 70 to 5 mole % of an alpha-olefin having 4 to 20 carbon atoms based on the total weight of these components is preferred as the copolymer of propylene and the alpha-olefin component.

The flexible olefin/nonconjugated diene copolymer (c) may preferably be, for example, a copolymer of ethylene, an alpha-olefin having 3 to 20 carbon atoms and a nonconjugated diene or a copolymer of propylene, an alpha-olefin having 4 to 20 carbon atoms, and a nonconjugated diene.

The alpha-olefin as one component of the copolymer may be the same as those exemplified above. Alpha-olefins having 3 to 10 carbon atoms are preferred among those having 3 to 20 carbon atoms, and alpha-olefins having 4 to 10 carbon atoms are preferred among those having 4 to 20 carbon atoms.

Examples of the nonconjugated diene are aliphatic non-conjugated dienes such as 1,4-hexadiene, 1,6-octadiene, 2-methyl-1,5-hexadiene, 6-methyl-1,5-heptadiene and 7-methyl-1,6-octadiene, cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene, 2,3-diisopropylidene-5-norbornene, 2-ethylidene-3-isopropylidene-5-norbornene and 2-propenyl-2,2-norbornadiene.

The flexible olefin/nonconjugated diene copolymer (c) may preferably be, for example, a copolymer composed of 30 to 95 mole % of ethylene and 70 to 5 mole % of an alpha-olefin having 3 to 20 carbon atoms based on the total amount of the ethylene and alpha-olefin components and 1 to 20 mole %, preferably 2 to 15 mole %, of the conjugated diene component based on the total amount of the ethylene, alpha-olefin and nonconjugated diene components or a copolymer composed of 50 to 95 mole % of propylene and 50 to 5 mole % of an alpha-olefin having 4 to 20 carbon atoms based on the total amount of the ethylene and alpha-olefin components, and 1 to 20 mole %, preferably 2 to 15 mole %, of the nonconjugated diene component based on the total amount of the propylene, alpha-olefin and nonconjugated diene components.

The flexible aromatic vinyl copolymer (d) is a random or block copolymer composed of the aromatic vinyl hydrocarbon component, or a hydrogenation product of the copolymer. Styrene is a preferred example of the aromatic vinyl hydrocarbon.

Examples of preferred conjugated dienes include butadiene and isoprene.

Advantageously, a styrene/butadiene block copolymer rubber, a styrene/butadiene/styrene block copolymer rubber, a styrene/isoprene/block copolymer rubber, a styrene/isoprene/styrene block copolymer rubber, a hydrogenated styrene/butadiene/styrene block copolymer rubber, a hydrogenated styrene/isoprene/styrene block copolymer rubber and a styrene/butadiene random copolymer rubber, for example, may advantageously be used as the flexible aromatic vinyl copolymer (d).

Preferably, the flexible aromatic vinyl copolymer (d) is a copolymer composed of 10 to 70 mole % of the aromatic vinyl hydrocarbon component and 90 to 30 mole % of the conjugated diene component based on the total amount of the aromatic vinyl hydrocarbon component and the conjugated diene component, or a hydrogenation product of the copolymer.

The above-exemplified hydrogenated styrene/butadiene/styrene block copolymer rubber is a copolymer rubber obtained by partially or wholly hydrogenating the double bonds remaining in a styrene/butadiene/styrene block copolymer rubber. The hydrogenated styrene/isoprene/styrene block copolymer rubber is a copolymer rubber obtained by partially or wholly hydrogenating the double bonds remaining in a styrene/isoprene/styrene block copolymer rubber.

As common properties, these flexible polymers (a), (b), (c) and (d) have a glass transition temperature of not more than 0° C., preferably not more than −10° C., especially preferably not more than −20° C., and an intrinsic viscosity [$\eta$], measured in decalin at 135° C., of preferably 0.01 to 10 dl/g, especially preferably 0.08 to 7 dl/g.

For the purpose of this invention, the amorphous or low-crystalline nature of the polymer is expressed by its crystalinity, measured by X-ray diffractometry, of 0 to 10%, preferably 0 to 7%, especially preferably 0 to 5%.

The flexible copolymers may be used singly or in combination with one another.

Another component of the polymer composition of this invention is an organic peroxide (C).

Examples of the organic peroxide (C) include ketone peroxides such as methyl ethyl ketone peroxide and cyclohexanone peroxide; peroxy ketals such as 1,1-bis(t-butylperoxy)cyclohexane and 2,2-bis(t-butylperoxy)octane; hydroperoxides such as t-butyl hydro peroxide, cumene hydroperoxide, 2,5-dimethylhexane-2,5-dihydroxyperoxide and 1,1,3,3-tetramethylbutyl hydro peroxide; dialkyl peroxides such as di-t-butyl peroxide, 2,5-dimethyl-2,5-di(t-butylperoxy)hexane and 2,5-dimethyl-2,5-di(t-butylperoxy)hexyne-3; diacyl peroxides such as lauryl peroxide and benzoyl peroxide; and peroxy esters such as t-butyl peroxyacetate, t-butyl peroxybenzoate and 2,5-dimethyl-2,5-di(benzoylperoxy)hexane.

The polymer composition of this invention comprises 100 parts by weight of the cyclo-olefinic random copolymer (A), 5 to 150 parts by weight of at least one flexible polymer (B), and 0.004 to 1.0 part by weight of the organic peroxide (C).

More specifically, the polymer composition of this invention contains 5 to 150 parts by weight, preferably 5 to 100 parts by weight, especially preferably 10 to 80 parts by weight, of the flexible copolymer (B) per 100 parts by weight of the cyclo-olefinic random copolymer (A).

The amount of the component (C) incorporated is 0.004 to 1 part by weight, preferably 0.05 to 0.5 part by weight, per 100 parts by weight of component (A).

In addition to the cyclo-olefinic random copolymer (A), the flexible copolymer (B) and the organic peroxide (C), the polymer composition may further comprise a compound having at least two radical-polymerizable functional groups in the molecule as component (D).

The inclusion of component (D) is preferred because they gives a polymer reaction product having higher impact strength.

The compound (D) having at least two radical-polymerizable functional groups in the molecule are divinylbenzene, vinyl acrylate and vinyl methacrylate. The amount of the component (D) to be included is not more than 1 part by weight, preferably 0.1 to 0.5 part by weight, per 100 parts by weight of components (A) and (B) combined.

As required, the copolymer composition in accordance with this invention may comprise, in addition to these components (A), (B), (C) and (D), conventional additives such as heat stabilizers, weather stabilizers, antistatic agents, slip agents, antiblocking agents, antihaze agents, lubricants, dyes, pigments, natural oils, synthetic oils, waxes, and organic or inorganic fillers. The amounts of these additives are properly determined according to the purposes for which the additives are used.

The stabilizers include, for example, phenolic antioxidants such as tetrakis[methylene-3-(3,5-di-t-butyl-4-hydroxyphenyl)propionate]methane, alkyl beta(3,5-di-t-butyl-4-hydroxyphenyl)propionates and 2,2'-oxamidebis(ethyl-3-(3,5-di-t-butyl-4-hydroxyphenyl)-propionate; fatty acid metal salts such as zinc stearate, calcium stearate and calcium 12-hydroxystearate; and esters of fatty acids with polyhydric alcohols, such as glycerol monostearate, glycerol monolaurate, glycerol distearate, pentaerythritol distearate and pentaerythritol tristearatre. They may be incorporated either singly or in combination. For example, a combination of tetrakis[methylene-3-(3,5-di-t-butyl-4-hydroxyphenyl)propionate]methane, zinc stearate and glycerol monostearate may be used.

The organic or inorganic fillers may include, for example, silica, diatomaceous earth, alumina, titanium dioxide, magnesium oxide, pumice powder, pumice balloon, aluminum hydroxide, magnesium hydroxide, basic magnesium carbonate, dolomite, calcium sulfate, potassium titanate, barium sulfate, calcium sulfite, talc, clay, mica, asbestos, glass fibers, glass flakes, glass beads, calcium silicate, montmorillonite, bentonite, graphite, aluminum powder, molybednum sulfide, boron fibers, silicon carbide fibers, polyethylene fibers, polypropylene fibers, polyester fibers and polyamide fibers.

The polymer composition of this invention may be prepared by known methods. For examples, the components may be mixed simultaneously. But is is also possible to mix components (A) and (B), and then mix the resulting mixture with component (C) or both components (C) and (D). The latter method is preferred. When the additives are to be included, they are preferably mixed with components (A) and (B).

Mixing of components (A) and (B) may be carried out by an extruder. Alternatively, components (A) and (B)

are fully dissolved in suitable solvents, for example saturated hydrocarbons such as heptane, hexane, decane and cyclohexane, or aromatic hydrocarbons such as toluene, benzene or xylene, and the solutions are then mixed (solution blending method). It is also possible to synthesize components (A) and (B) in separate polymerization vessels, and the resulting polymers (A) and (B) are blended in another vessel. The resulting composition of components (A) and (B) are then mixed with component (C) or both components (C) and (D) to give the polymer composition of this invention.

When the polymer composition of this invention is heat-treated at a temperature at which the organic peroxide as component (C) is decomposed, a reaction product of the polymer composition results.

The above heat-treatment is carried out by exposing the polymer composition to a temperature at which the organic peroxide (C) is decomposed, or at a higher temperature, preferably a temperature at which the half life of the organic peroxide (C) is 1 minute, or a higher temperature.

This heat-treatment reaction may be performed in the molten state by using, for example, an extruder. Alternatively, the composition is dissolved in a solvent, and the heat-treatment is carried out in solution.

The heat-treatment conditions may vary depending upon the type of the organic peroxide used. For example, when the treatment is carried out in the molten state, a temperature of 150° to 300° C., and a period of 10 seconds to 30 minutes may preferably be employed. In the case of the treatment in solution, a temperature of 50° to 300° C. and a period of 10 seconds to 2 hours may preferably be used.

This reaction treatment may also be effected simultaneously with the operation of mixing component (C) to the composition composed of components (A) and (B).

In the above heat-treatment, the organic peroxide (C) is decomposed and a radical reaction takes place to give a reaction product in which components (A) and (B) are partially crosslinked. When the radicalpolymerizable compound (D) is present in the composition, crosslinking takes place more easily to give a reaction product having excellent strength.

The resulting reaction product of the polymer composition has a crosslinked structure, and therefore has excellent heat resistance, chemical resistance, solvent resistance, dielectric properties, rigidity, transparency, impact strength and moldability. It can be advantageously used in the applications which conventional cyclo-olefinic random copolymer compositions find.

Specifically, a reaction product of polymer compositions of the invention having a low molecular weight are useful as synthetic waxes in candles, impregnating agents for match splints, paper treating agents, sizing agents, rubber antioxidants, cardboard water-proofing agents, retarders for chemical fertilizers, ceramic binders, electrical insulators for paper capacitors, electric wires and cables, neutron deceleration agents, textile finishing aids, water-repellent agents for building materials, coating protecting agents, gloss agents, thixotropy imparting agents, agents for imparting hardness to pencil and crayon cores, substrates for carbon ink, electrophotographic toners, lubricants for molding of synthetic resins, mold releasing agents, resin colorants, hot-melt adhesives and lubricating greases. Polymer compositions of the invention having high molecular weights are useful as water tanks of electrical irons, electronic oven parts, base boards for printed circuits, circuit base boards for high frequency waves, electrically conductive sheets or films, camera bodies, housings of various measuring devices and instruments, various exterior and interior finishing materials for automobiles, automotive part, films, sheets and helmets.

The polymer reaction product provided by this invention is molded by known methods. For example, it may be fabricated by extrusion, injection molding, blow molding, rotational molding, and foaming-molding by using a single-screw extruder, a vent-type extruder, a twin-screw extruder, a conical twin-screw extruder, a cokneader, a plasticator, a mixtruder, a twin-screw conical screw extruder, a planetary screw extruder, a gear extruder, a screwless extruder, etc.

Since the polymer composition of this invention comprises the cyclo-olefinic random copolymer (A), the flexible copolymer (B) and the organic peroxide (C), it can be crosslinked by radical reaction to give a reaction product having excellent heat resistance, heat aging resistance, chemical resistance, solvent resistance, dielectric properties, rigidity and impact strength, particularly impact strength at low temperatures.

The following examples specifically illustrate the present invention.

The various properties in this invention are measured and evaluated by the following methods.

(1) Melt flow index ($MRF_{260° C.}$)

Measured at a temperature of 260° C. under a load of 2.16 kg in accordance with ASTM D1238.

(2) Preparation of a test sample

An injection-molding machine (model IS-35 supplied by Toshiba Machinery Co., Ltd.) and a mold for a test sample were used, and the composition was molded under the following molding conditions.
Cylinder temperature: 220° C.
Mold temperature: 60° C.
Injection pressure: primary=1000 kg/cm$^2$, secondary=800 kg/cm$^2$
Injection speed (primary): 30 mm/sec.
Screw rotating speed: 150 rpm
Cycles: Injection+pressure holding=7 sec. cooling=15 sec.

(3) Bending test

Performed in accordance with ASTM D790
Test piece shape: 5×½×⅛ t inches
Span distance: 51 mm
Test speed: 20 mm/min.
Test temperature: 23° C.

(4) Izod impact test

Performed in accordance with ASTM D256
Test specimen shape: 5/2×½×⅛ t inches (notched)
Test temperature: 23° C.

(5) Heat distortion temperature (HDT)

Test specimen shape: 5×¼×½ t inches
Load: 264 psi (6) Softening temperature (TMA)

Measured by means of a Thermomechanical analyzer made by Du Pont by the heat distortion behavior of a sheet having a thickness of 1 mm. Specifically, a quartz needle was placed on the sheet and a load of 49 g was applied. The temperature was elevated at a speed of 5° C./min. The temperature at which the needle penetrated the sheet to a depth of 0.635 mm was defined as the softening temperature.

(7) Glass transition temperature (Tg)

Measured at a temperature elevation rate of 10° C./min. by using DSC-20 (supplied by SEIKO Electronics Industry Co., Ltd.).

EXAMPLE 1

Four kilograms of pellets of a random copolymer of ethylene and 1,4,5,6-dimethano-1,2,3,4,4a,5,8,8a-octahydronapthalene (abbreviated as DMON) having an ethylene content, measured by $^{13}$C-NMR, of 62 mole %, an MFR$_{260°\ C.}$ of 35 g/10 min. an intrinsic viscosity, measured in decalin at 135° C., of 0.47 dl/g, a softening temperature (TMA) of 148° C. a Tg of 137° C. as component (A) and 1 kg of pellets of an ethylene-propylene random copolymer (ethylene content 80 mole %, Tg=54° C., MFR$_{230°\ C.}$=0.7 g/10 min., [η]=2.2 dl/g) as component (B) were fully mixed, and then melt-blended by a twin-screw extruder (PCM 45 supplied by Ikegai Tekko Co., Ltd.) at a cylinder temperature of 220° C. The blend was then pelletized by a pelletizer. One kilogram of Perhexyne 25B (trademark) (a product of Nippon Oils and Fats Co., Ltd., chemical structure:

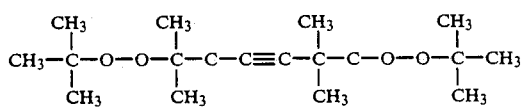

as component (C) and 3 g of divinylbenzene as component (D) were added to 1 kg of the pellets composed of components (A) and (B), and they were fully mixed. The resulting mixture was reacted in the molten state by using the above twin-screw extruder (cylinder temperature 230° C.) and pelletized.

Test pieces were prepared by the above methods, and their properties were measured.

The results are shown in Table 1.

EXAMPLES 2-4

Example 1 was repeated except that the type or amount of component (C) was varied.

The results are shown in Table 1.

EXAMPLES 5-9

Example 1 was repeated except that each of the polymers indicated in Table 2 was used instead of the ethylene/propylene random copolymer as component (B).

The results are shown in Table 2.

TABLE 1

| Example | Component (C) Type | Amount (g) | Flexural modulus (kg/cm$^2$) | Flexural strength (kg/cm$^2$) | Izod impact strength (kg · cm/cm) | HDT (°C.) | MFR (g/10 min) |
|---|---|---|---|---|---|---|---|
| 1 | Perhexyne 25B (*1) | 1 | 19500 | 630 | 20 | 120 | 8 |
| 2 | Perhexyne 25B (*1) | 3 | 19700 | 620 | 22 | 122 | 7 |
| 3 | Percadox 14 (*2) | 3 | 19300 | 620 | 19 | 120 | 7 |
| 4 | Perbutyl D (*3) | 3 | 19600 | 630 | 18 | 120 | 8 |

Note
(*1): trademark for a product of Nippon Oils and Fats, Co., Ltd.
(*2): trademark for a product of Japan Kayaku Noury, Co., Ltd.
(*3): trademard for a product of Nippon Oils and Fats, Co., Ltd.

TABLE 2

| Example | Component (B) Type | Composition | [η](dl/g) | Tg (°C.) | Flexural modulus (kg/cm$^2$) | Flexural strength (kg/cm$^2$) | Izod impact strength (kg · cm/cm) | HDT (°C.) | MFR (g/10 min) |
|---|---|---|---|---|---|---|---|---|---|
| 5 | Ethylene/propylene random copolymer | Ethylene content 80 mole % | 1.3 | −55 | 19000 | 620 | 19 | 121 | 10 |
| 6 | Ethylene/propylene ethylidene-norbornane random copolymer | Ethylene content 67 mole % Ethylidene norborene content 3 mole % | 2.2 | −45 | 20300 | 680 | 16 | 121 | 9 |
| 7 | Ethylene/propylene/ DMON random copolymer | Ethylene content 66 mole % DMON content 3 mole % | 2.5 | −35 | 20800 | 690 | 15 | 120 | 10 |
| 8 | Styrene/isoprene/ styrene block co-polymer, hydrogenated | Styrene content 30 wt. % | 0.65 | −58 90 | 19600 | 640 | 13 | 120 | 14 |
| 9 | Styrene/butadiene random copolymer | Styrene content 24 wt. % | 1,5 | −57 | 19800 | 650 | 16 | 119 | 9 |

EXAMPLE 10

Example 1 was repeated except that an ethylene/DMON random copolymer having an ethylene content of 71 mole %, an MFR of 20 g/10 min., an intrinsic viscosity of 0.60 dl/g, a softening point (TMA) of 115° C., and a Tg of 98° C. was used instead of the ethylene/DMON random copolymer used in Example 1. The resulting composition had the following properties.

Flexural modulus: 17300 kg/cm$^2$
Flexural strength: 640 kg/cm$^2$
Izod impact strength: 60 kg-cm/cm
HDT: 90° C.
MFR$_{260°\ C.}$: 7 g/10 mn.

COMPARATIVE EXAMPLE

Example 1 was repeated except that components (C) and (D) were not used.

The resulting composition had the following properties.

Flexural modulus: 22000 kg/cm$^2$
Flexural strength: 790 kg/cm$^2$

Izod impact strength: 5 kg-cm/cm
HDT: 124° C.
MFR$_{260°}$ C.: 16.2 g/10 mn.

We claim:
1. A polymer composition comprising
(A) 100 parts by weight of a cyclo-olefinic random copolymer comprising an ethylene component and a cyclo-olefin component and having an intrinsic viscosity, measured in decalin at 135° C., of 0.05 to 10 dl/g, a glass transition temperature (Tg) of 50° to 230° C., and a softening point of at least 70° C.,
(B) 5 to 150 parts by weight of at least one flexible polymer having a glass transition temperature of not more than 0° C. selected from the group consisting of
  (a) a flexible cyclo-olefinic random copolymer comprising an ethylene component, a cyclo-olefin component and an alpha-olefin component having 3 to 20 carbon atoms,
  (b) an amorphous or low-crystalline flexible olefinic copolymer comprising at least two components selected from the group consisting of an ethylene component and alpha-olefin components having 3 to 20 carbon atoms,
  (c) a flexible olefin/nonconjugated diene copolymer comprising a nonconjugated diene component and at least two components selected from the group consisting of an ethylene component and alpha-olefin components having 3 to 20 carbon atoms, and
  (d) a flexible aromatic vinyl copolymer selected from the group consisting of random copolymers and block copolymers each comprising an aromatic vinyl hydrocarbon component and a conjugated diene component, and hydrogenation products of these copolymers, and
(C) 0.004 to 1.0 part by weight of an organic peroxide.

2. The polymer composition of claim 1 in which the cyclo-olefin component of the cyclo-olefinic random copolymer (A) is selected from the group consisting of cyclo-olefins of formula (I)

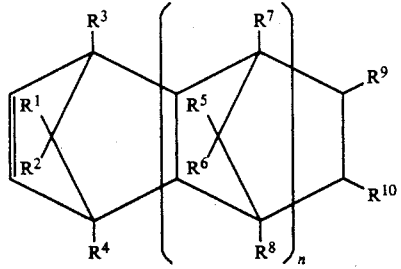

(I)

wherein $R^1$, $R^2$, $R^3$, $R^4$, $R^5$, $R^6$, $R^7$, $R^8$, $R^9$ and $R^{10}$ are identical or different, and each represents a hydrogen atom, a halogen atom or a monovalent hydrocarbon group, and n is 0 or a positive integer;

cyclo-olefins of formula (II)

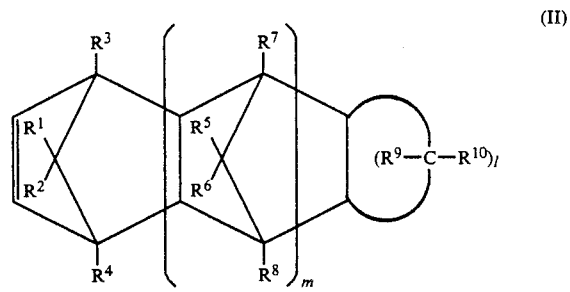

(II)

wherein $R^1$, $R^2$, $R^3$, $R^4$, $R^5$, $R^6$, $R^7$, $R^8$, $R^9$ and $R^{10}$ are as defined in formula (I), m is 0 or a positive integer, and L is an integer of at least 3;

cyclo-olefins of formula (III)

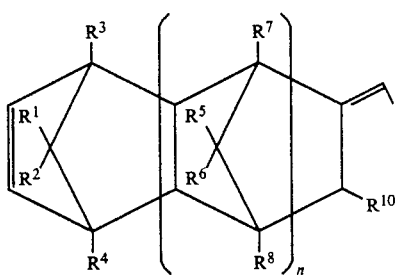

(III)

wherein $R^1$, $R^2$, $R^3$, $R^4$, $R^5$, $R^6$, $R^7$, $R^8$, $R^9$ and $R^{10}$ and n are as defined in formula (I);

cyclo-olefins of formula (IV)

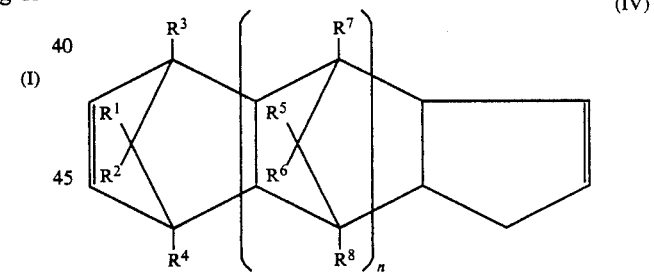

(IV)

wherein $R^1$, $R^2$, $R^3$, $R^4$, $R^5$, $R^6$, $R^7$, $R^8$ and n are as defined in formula (I); and cyclo-olefins of formula (V)

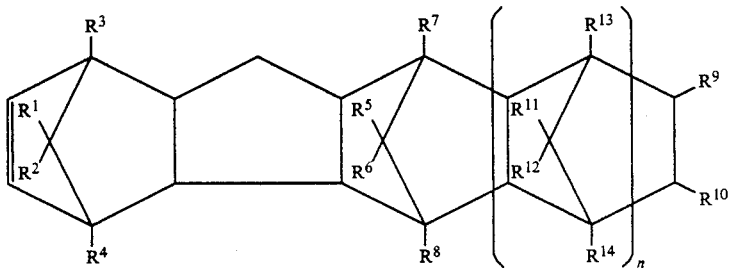

(V)

wherein $R^1$, $R^2$, $R^3$, $R^4$, $R^5$, $R^6$, $R^7$, $R^8$, $R^9$ and $R^{10}$ an n are as defined in formula (I), and $R^{11}$, $R^{12}$, $R^{13}$ and $R^{14}$, independently from each other and from $R^1$, are selected from a hydrogen atom, halogen atoms and monovalent hydrocarbon groups.

3. The polymer composition of claim 2 in which the cyclo-olefin in the flexible cyclic olefinic random copolymer (a) is selected from the cycloolefins of formulae (I), (II), (III), (IV) and (V) above.

4. The polymer composition of claim 1 in which the cyclo-olefinic random copolymer (A) is composed of 40 to 85 mole % of the ethylene component and 60 to 15 mole % of the cyclo-olefin component based on the total weight of the ethylene and cyclo-olefin components.

5. The polymer composition of claim 1 in which the cyclo-olefinic random copolymer (A) has a crystallinity, measured by X-ray diffractometry, of 0 to 10%.

6. The polymer composition of claim 1 in which the at least one flexible polymer (B) comprises the cyclo-olefinic random copolymer (a) which comprises 40 to 98 mole % of the ethylene component, 2 to 20 mole % of the cyclo-olefin, and 2 to 50 mole % of the alpha-olefin component based on the total weight of the ethylene component, the cyclo-olefin component and the alpha-olefin component.

7. The polymer composition of claim 6 in which the flexible cyclo-olefinic random copolymer (a) has an intrinsic viscosity, measured in decalin at 135° C., of 0.01 to 10 dl/g.

8. The polymer composition of claim 1 in which the at least one flexible polymer (B) comprises the olefinic copolymer (b) which is a copolymer of ethylene with an alpha-olefin having 3 to 20 carbon atoms, or a copolymer of propylene and an alpha-olefin having 4 to 20 carbon atoms.

9. The polymer composition of claim 1 in which the at least one flexible polymer (B) comprises the olefinic copolymer (b) which is a copolymer comprising 50 to 90 mole % of ethylene and 50 to 5 mole % of an alpha-olefin having 3 to 20 carbon atoms based on the total weight of ethylene and the alpha-olefin having 3 to 20 carbon atoms, or a copolymer comprising 50 to 95 mole % of propylene and 50 to 5 mole % of an alpha-olefin having 4 to 20 carbon atoms based on the total weight of propylene and the alpha-olefin having 4 to 20 carbon atoms.

10. The polymer composition of claim 1 in which the at least one flexible polymer (B) comprises the olefin/-nonconjugated diene copolymer (c) which is a copolymer comprising 50 to 95 mole % of ethylene and 50 to 5 mole % of an alpha-olefin having 3 to 20 carbon atoms based on the total weight of the ethylene component and the alpha-olefin component and 1 to 20 mole % of a nonconjugated diene based on the total weight of the ethylene component, the alpha-olefin component and the nonconjugated diene component, or a copolymer comprising 50 to 95 mole % of propylene and 50 to 5 mole % of an alpha-olefin having 4 to 20 carbon atoms based on the total weight of the ethylene component and the alpha-olefin component, and 1 to 20 mole % of a non-conjugated diene based on the total weight of the propylene component, the alpha-olefin component and the nonconjugated diene component.

11. The polymer composition of claim 1 in which the at least one flexible polymer (B) comprises the aromatic vinyl copolymer (d) which comprises 10 to 70 mole % of an aromatic vinyl hydrocarbon and 90 to 30 mole % of a conjugated diene based on the total weight of the aromatic vinyl hydrocarbon component and the conjugated diene component.

12. The polymer composition of claim 1 which further comprises not more than 1 part by weight, per 100 parts by weight of the components (A) and (B), of (D) a compound having at least two radical-polymerizable functional groups in the molecule.

13. A reaction product obtained by treating the polymer composition of claim 1 under conditions which induce the decomposition of the organic peroxide (C).

14. The reaction product of claim 13 in which the cyclo-olefin component of the cyclo-olefinic random copolymer (A) is selected from the group consisting of cyclo-olefins of formula (I)

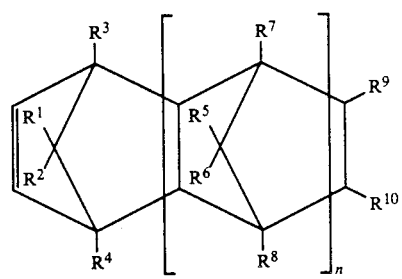

wherein $R^1$, $R^2$, $R^3$, $R^4$, $R^5$, $R^6$, $R^7$, $R^8$, $R^9$ and $R^{10}$ are identical or different, and each represents a hydrogen atom, a halogen atom or a monovalent hydrocarbon group, and n is 0 or a positive integer;

cyclo-olefins of formula (II)

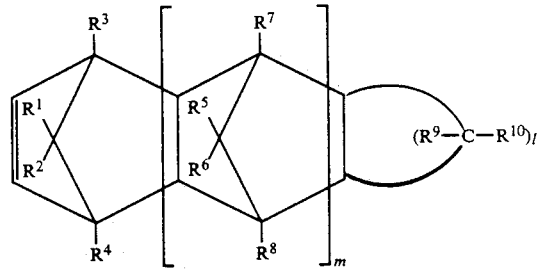

wherein $R^1$, $R^2$, $R^3$, $R^4$, $R^5$, $R^6$, $R^7$, $R^8$, $R^9$ and $R^{10}$ are as defined in formula (I), m is 0 or a positive integer, and L is an integer of at least 3;

cyclo-olefins of formula (III)

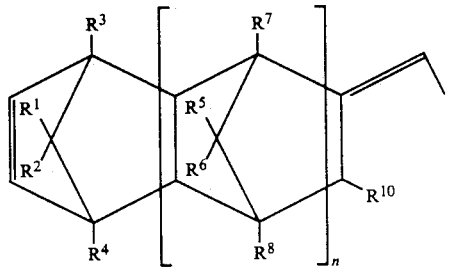

wherein $R^1$, $R^2$, $R^3$, $R^4$, $R^5$, $R^6$, $R^7$, $R^8$, $R^9$ and $R^{10}$ and n are as defined in formula (I);

cyclo-olefins of formula (IV)

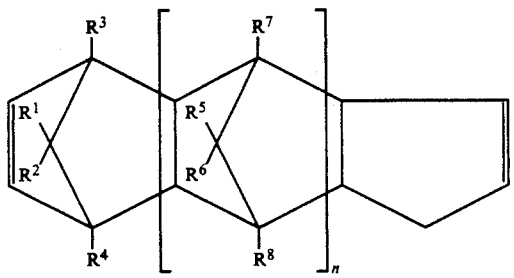

wherein $R^1$, $R^2$, $R^3$, $R^4$, $R^5$, $R^6$, $R^7$, $R^8$ and n are as defined in formula (I); and cyclo-olefins of formula (V)

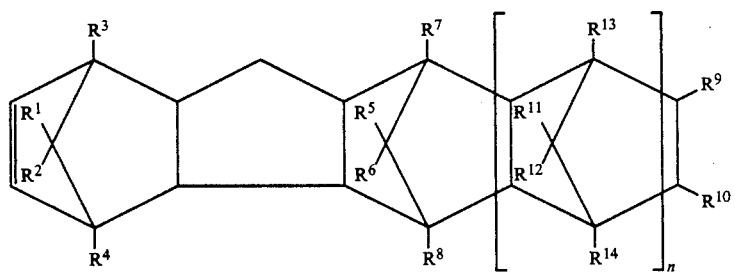

wherein $R^1$, $R^2$, $R^3$, $R^4$, $R^5$, $R^6$, $R^7$, $R^8$, $R^9$ and $R^{10}$ and n are as defined in formula (I), and $R^{11}$, $R^{12}$, $R^{13}$ and $R^{14}$, independently from each other and from $R^1$, are selected from a hydrogen atom, halogen atoms and monovalent hydrocarbon groups.

15. The reaction product of claim 14 in which the cyclo-olefin in the flexible cyclic olefinic random copolymer (a) is selected from the cyclo-olefins of formulae (I), (II), (III), (IV) and (V) above.

16. The reaction product of claim 14 in which the cyclo-olefinic random copolymer (A) is composed of 40 to 85 mole % of the ethylene component and 60 to 15 mole % of the cyclo-olefin component based on the total weight of the ethylene and cyclo-olefin components.

17. The reaction product of claim 14 in which the cyclo-olefin random copolymer (A) has a crystallinity measured by X-ray diffractometry, of 0 to 10%.

18. The reaction product of claim 14 in which the at least one flexible polymer (B) comprises the cyclo-olefinic random copolymer (a) which comprises 40 to 98 mole % of the ethylene component, 2 to 20 mole % of the cyclo-olefin, and 2 to 50 mole % of the alpha-olefin component based on the total weight of the ethylene component, the cyclo-olefin component and the alpha-olefin component.

19. The reaction product of claim 18 in which the flexible cyclo-olefinic random copolymer (a) has an intrinsic viscosity, measured in decalin at 135° C., of 0.01 to 10 dl/g.

20. The reaction product of claim 14 in which the at least one flexible polymer (B) comprises the olefinic copolymer (b) which is a copolymer of ethylene with an alpha-olefin having 3 to 20 carbon atoms, or a copolymer of propylene and an alpha-olefin having 4 to 20 carbon atoms.

21. The reaction product of claim 14 in which the at least one flexible polymer (B) comprises the olefinic copolymer (b) which is a copolymer comprising 50 to 95 mole % of ethylene and 50 to 5 mole % of an alpha-olefin having 3 to 20 carbon atoms based on the total weight of ethylene and the alpha-olefin having 3 to 20 carbon atoms, or a copolymer comprising 50 to 95 mole % of propylene and 50 to 5 mole % of an alpha-olefin having 4 to 20 carbon atoms based on the total weight of propylene and the alpha-olefin having 4 to 20 carbon atoms.

22. The reaction product of claim 14 in which the at least one flexible polymer (B) comprises the olefin/nonconjugated diene copolymer (c) which is a copolymer comprising 50 to 95 mole % of ethylene and 50 to 5 mole % of an alpha-olefin having 3 to 20 carbon atoms based on the total weight of the ethylene component and the alpha-olefin component and 1 to 20 mole % of a nonconjugated diene based on the total weight of the ethylene component, the alpha-olefin component and the nonconjugated diene component, or a copolymer comprising 50 to 95 mole % of propylene and 50 to 5 mole % of an alpha-olefin having 4 to 20 carbon atoms based on the total weight of the ethylene component and the alpha-olefin component, and 1 to 20 mole % of a non-conjugated diene based on the total weight of the propylene component, the alpha-olefin component and the nonconjugated diene component.

23. The reaction product of claim 14 in which the at least one flexible polymer (B) comprises the aromatic vinyl copolymer (d) which comprises 10 to 70 mole % of an aromatic vinyl hydrocarbon and 90 to 30 mole % of a conjugated diene based on the total weight of the aromatic vinyl hydrocarbon component and the conjugated diene component.

24. The reaction product of claim 14 which further comprises not more than 1 part by weight, per 100 parts by weight of the components (A) and (B), of (D) a compound having at least two radical-polymerizable functional groups in the molecule.

* * * * *